(12) United States Patent
Madhusudana et al.

(10) Patent No.: US 9,378,103 B2
(45) Date of Patent: Jun. 28, 2016

(54) COORDINATION TECHNIQUES FOR REDUNDANT ARRAY OF INDEPENDENT DISKS STORAGE CONTROLLERS

(71) Applicant: LSI Corporation, San Jose, CA (US)

(72) Inventors: Naresh Madhusudana, Bangalore (IN); Naveen Krishnamurthy, Bangalore (IN); Sridhar Rao Veerla, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 226 days.

(21) Appl. No.: 14/280,888

(22) Filed: May 19, 2014

(65) Prior Publication Data
US 2015/0331765 A1    Nov. 19, 2015

(51) Int. Cl.
| G06F 11/00 | (2006.01) |
|---|---|
| G06F 11/20 | (2006.01) |
| G06F 11/10 | (2006.01) |
| G06F 9/44 | (2006.01) |
| G06F 13/42 | (2006.01) |

(52) U.S. Cl.
CPC .............. *G06F 11/2058* (2013.01); *G06F 9/44* (2013.01); *G06F 9/4406* (2013.01); *G06F 11/10* (2013.01); *G06F 11/1092* (2013.01); *G06F 11/20* (2013.01); *G06F 11/203* (2013.01); *G06F 13/42* (2013.01); *G06F 13/4221* (2013.01); *G06F 2201/84* (2013.01)

(58) Field of Classification Search
CPC . G06F 11/20; G06F 11/2005; G06F 11/2017; G06F 11/202; G06F 11/2023; G06F 11/2028; G06F 11/2041; G06F 11/203; G06F 11/2058; G06F 11/2089; G06F 11/2092
See application file for complete search history.

(56) References Cited

U.S. PATENT DOCUMENTS

| 7,917,682 | B2 | 3/2011 | Bakthavathsalam | |
|---|---|---|---|---|
| 8,438,324 | B2 | 5/2013 | Cho | |
| 8,484,400 | B2 | 7/2013 | Cho | |
| 8,645,623 | B1 | 2/2014 | O'Shea et al. | |
| 8,880,800 | B2 * | 11/2014 | Mathew | G06F 11/1076 710/313 |
| 2009/0094620 | A1 * | 4/2009 | Kalwitz | G06F 11/2089 719/325 |
| 2009/0157958 | A1 * | 6/2009 | Maroney | G06F 11/1076 711/114 |
| 2010/0306576 | A1 * | 12/2010 | Tsukada | G06F 11/2089 714/5.11 |
| 2012/0059991 | A1 * | 3/2012 | Cuddihy | G06F 3/0605 711/114 |
| 2013/0067163 | A1 | 3/2013 | Velayudhan et al. | |
| 2013/0339594 | A1 | 12/2013 | Math et al. | |

(Continued)

OTHER PUBLICATIONS

PCI Express®, Base Specification, Revision 3.0, Nov. 10, 2010.
(Continued)

*Primary Examiner* — Michael Maskulinski (57) ABSTRACT

Methods and structure for coordinating between Redundant Array of Independent Disks (RAID) storage controllers are provided. An exemplary system includes a RAID controller. The RAID controller includes a Peripheral Component Interconnect Express (PCIe) interface, a Serial Attached Small Computer System Interface (SAS) port operable to communicate with another RAID controller, and a command unit. The command unit is able to direct the interface to contact another PCIe interface at the other controller, to acquire an identifier of the other controller stored in a PCIe Inbound Map (PIM) for the other interface, and to activate a feature for the controller that enables cooperative management of storage devices between the controller and the other controller, if the identifier of the other controller matches discovery information maintained at the controller.

20 Claims, 8 Drawing Sheets

(56) References Cited

U.S. PATENT DOCUMENTS

| | | | |
|---|---|---|---|
| 2014/0115223 A1* | 4/2014 | Guddeti | G06F 13/404 710/314 |
| 2014/0173149 A1* | 6/2014 | Walker | G06F 9/45533 710/263 |
| 2014/0173364 A1* | 6/2014 | Nishita | G06F 11/1625 714/48 |
| 2015/0317219 A1* | 11/2015 | Madhusudana | G06F 11/2017 714/6.21 |

OTHER PUBLICATIONS

Penokie, Working Draft American National Standard, Project T10/BSR INCITS 492, Revision 4, Jul. 24, 2013.

U.S. Appl. No. 14/173,540.

* cited by examiner

FIG. 8

COORDINATION TECHNIQUES FOR REDUNDANT ARRAY OF INDEPENDENT DISKS STORAGE CONTROLLERS

FIELD OF THE INVENTION

The invention relates generally to Redundant Array of Independent Disks (RAID) systems.

BACKGROUND

In Single Server High Availability (SSHA) systems, a single host is coupled with multiple RAID controllers. The RAID controllers are each connected to a shared set of storage devices via a common protocol (e.g., Small Computer System Interface (SCSI), Serial Attached SCSI (SAS), etc.), and the RAID controllers are used to retrieve and/or store data at the set of storage devices. The host utilizes a Multi-Path Input/Output (MPIO) driver to direct Input/Output (I/O) operations to the RAID controllers. The RAID controllers can each manage I/O for one or more logical RAID volumes, and serve as backup controllers for each other in case of a failure. Thus, when one RAID controller fails, the other RAID controller assumes control of logical volumes that were previously managed by the failed controller.

SUMMARY

Systems and methods herein utilize shared Peripheral Component Interconnect Express (PCIe) memory access between RAID controllers. One exemplary embodiment includes a RAID controller. The RAID controller includes a Peripheral Component Interconnect Express (PCIe) interface, a Serial Attached Small Computer System Interface (SAS) port operable to communicate with another RAID controller, and a command unit. The command unit is able to direct the interface to contact another PCIe interface at the other controller, and to acquire an identifier of the other controller stored in a PCIe Inbound Map (PIM) for the other interface. The command unit is also able to activate a feature for the controller that enables cooperative management of storage devices between the controller and the other controller, if the identifier of the other controller matches discovery information maintained at the controller.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
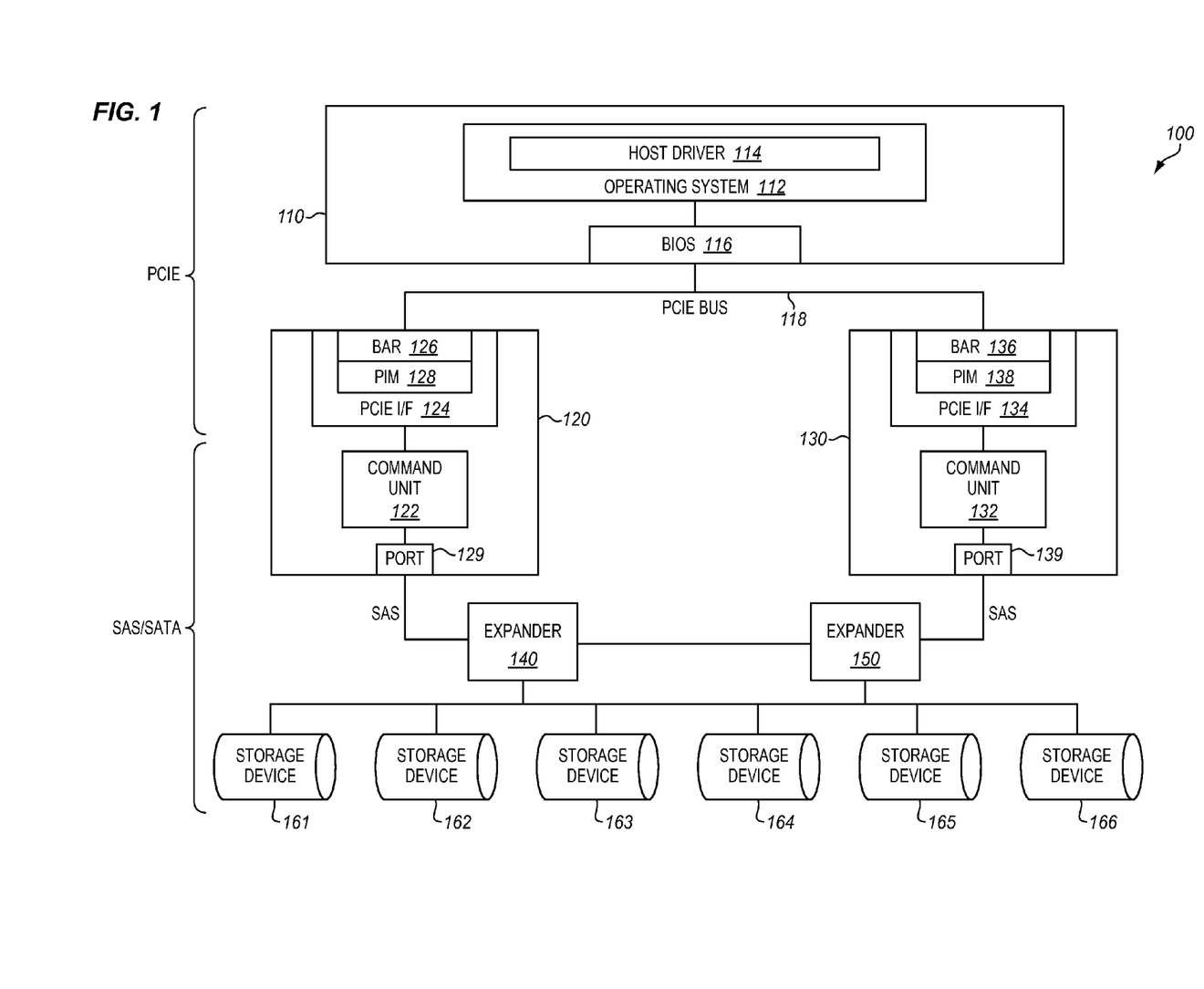
FIG. 1 is a block diagram of an exemplary SSHA architecture.

FIG. 1 is a block diagram of an exemplary Single Server High Availability (SSHA) architecture 100. SSHA architecture 100 provides redundant I/O paths for host 110 to store data at (and/or read data from) a set of storage devices 161-166. In this embodiment, host 110 is coupled to PCIe bus 118, which is itself connected to RAID controllers 120 and 130. RAID controllers 120 and 130 are each coupled via an intervening SAS expander (140 and 150 respectively) to storage devices 161-166.

While in operation, Operating System (OS) 112 generates host I/O requests directed to logical volumes kept on storage devices 161-166 and owned by (i.e., under control of) RAID controllers 120 and 130. These I/O requests, directed to individual logical volumes, are routed to the appropriate RAID controller via logic within host driver 114. Host driver 114 then utilizes Asymmetric Logical Unit Access (ALUA) techniques to direct the host I/O requests to their appropriate RAID controller.

Each host I/O request is received at a PCIe interface (I/F) (e.g., 124, 134) of a RAID controller, and the RAID controller processes the requests into one or more SAS and/or Serial Advanced Technology Attachment (SATA) commands that are directed to individual storage devices. In this manner, host I/O is seamlessly translated into a series of SAS/SATA commands for writing and/or retrieving data. Thus, RAID controllers 120 and 130 operate as SAS initiators for SSHA architecture 100.

The configuration of RAID controllers 120 and 130 with respect to each logical volume can be implemented as an active-passive configuration or an active-active configuration as desired. In this configuration, each RAID controller actively manages I/O directed to the logical volumes that it owns, and is prepared to assume control of logical volumes owned by the other RAID controller if needed. The redundancy implemented by RAID controllers 120 and 130 is highly desirable in SSHA architectures in order to ensure that data remains available even if a failure occurs in one or more devices.

SSHA architecture 100 exhibits a benefit over prior SSHA architectures, because RAID controllers 120 and 130 are each capable of utilizing PCIe bus 118 to help determine whether they are operating in an SSHA environment. This can help RAID controllers 120 and 130 to independently enable and coordinate features for cooperative management of storage devices, thereby saving the processing resources of host 110 during boot.

Host 110 comprises any combination of components and/or devices capable of manipulating data. For example, host 110 can comprise a server, a general purpose computer, an integrated circuit, etc. In this embodiment, one or more processors and memories within host 110 implement OS 112, host driver 114, and Basic Input Output System (BIOS) 116. OS 112 manages the general operations of host 110. Host driver 114 can comprise, for example, an MPIO driver or Host Bus Adapter (HBA) driver, implemented as a low level driver or a block-level driver, that is capable of determining the logical volume that each incoming request is directed to. Host driver 114 then directs each request (via PCIe bus 118) to the RAID controller that is listed as the active controller for the corresponding logical volume. BIOS 116 is distinct from the system BIOS used for booting host 110, and can be implemented by circuitry, processors, and/or memories.

RAID controllers 120 and 130 each include their own PCIe interface (124, 134). Each PCIe interface includes a memory that lists a Base Address Register (BAR) address (126, 136) of the RAID controller on PCIe bus 118. The BAR address indicates a location of the interface on PCIe bus 118. Each PCIe interface also includes a PCIe Inbound Map (PIM) (128, 138). Each PIM stores information indicating an identifier (e.g., a SAS address) for the RAID controller that the PIM is located within. A PIM can also store SAS discovery information and/or a controller status for its RAID controller.

The discovery information kept in a PIM represents the current discovery information used by the RAID controller to manage interactions with other SAS devices. In one embodiment, the discovery information in the PIM mirrors an "active" discovery list used by the RAID controller during normal RAID operations (and kept within a separate memory of the RAID controller). In another embodiment, the discovery information in the PIM serves as the "active" discovery list.

Each RAID controller also includes a command unit (122, 132) that manages the operations of the RAID controller. In one embodiment, these operations include translating host I/O requests into one or more SAS/SATA requests sent out via a SAS port (129, 139) (e.g., a SAS wide or narrow port comprising one or more SAS physical links (PHYs)). In further embodiments, the operations include coordinating MPIO operations between devices, performing SAS discovery if a SAS topology change is detected, etc. A command unit can be implemented as custom circuitry, a processor executing programmed instructions stored in memory, or some combination thereof.

RAID controllers 120 and 130 can additionally be coupled for communication via one or more dedicated intercontroller links (e.g., SAS links, Ethernet links, etc.). Such links can be used, for example, in order to ship I/O between controllers and/or mirror RAID cache data (e.g., as discussed in U.S. Pat. Pub. 2013/0067163).

A switched fabric (in this embodiment, SAS expanders 140 and 150) couples the RAID controllers with storage devices 161-166. Thus, even if one RAID controller fails, the other RAID controller can access storage devices 161-166 via the switched fabric in order to manage I/O for the logical volumes. Storage devices 161-166 implement the persistent storage capacity for SSHA architecture 100, and are capable of writing and/or reading data for a logical volume in a computer readable format. For example, storage devices 161-166 can comprise magnetic hard disks, solid state drives, optical media, etc. compliant with protocols for SAS and/or SATA. As used herein, a logical volume comprises allocated storage space and data available at one or more storage devices. A logical volume can be implemented on any number of storage devices as a matter of design choice. Furthermore, the storage devices need not be dedicated to only one logical volume. The particular arrangement, number, and configuration of components described herein with regard to FIG. 1 is exemplary and non-limiting.

Figure 2:
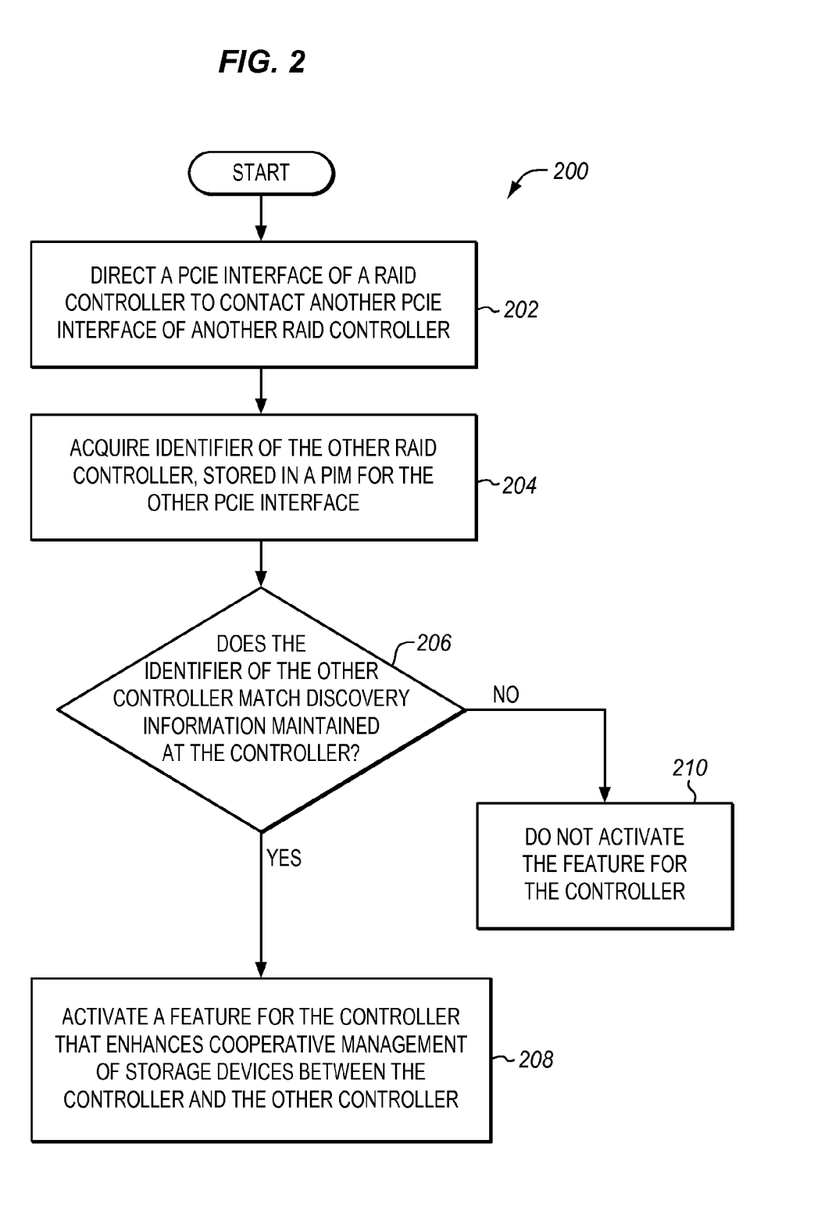
FIG. 2 is a flowchart describing an exemplary method to configure storage controllers to enable cooperative management features.

FIG. 2 is a flowchart 200 describing an exemplary method to configure storage controllers to enable cooperative management features. Assume, for this embodiment, that host 110 has just started booting, meaning that BIOS 116 is currently available, but host driver 114 and/or OS 112 are still initializing. Also, assume that BIOS 116 (or an option Read Only Memory (ROM) BIOS resident in each of RAID controllers 120 and 130) has determined the BAR address of each of RAID controllers 120 and 130 via initialization processes on PCIe bus 118. The BIOS has provided each RAID controller with the BAR address(es) of its peer RAID controller(s), enabling PCIe communications between RAID controllers 120 and 130 via PCIe bus 118. In this case, instead of waiting for a Host Bus Adapter (HBA) driver and/or OS 112 to completely boot and instruct the RAID controllers that they will be working together in an SSHA environment to manage storage devices on the same SAS domain, RAID controllers 120 and 130 are capable of detecting that they are on the same SAS domain and deploying cooperative volume management techniques without being directed to do so by host 110.

Since the RAID controllers are both connected via PCIe bus 118, and because the RAID controllers have been given each other's BAR addresses, they are both aware that they are operating on the same server or under the same PCIe root complex. However, at this point in time it is unclear whether the RAID controllers are performing operations for the same SAS domain (meaning that SSHA features should be enabled) or different SAS domains (meaning that the storage controllers will not implement SSHA). Thus, RAID controller 120 attempts to determine whether or not RAID controller 130 is operating on a different SAS domain.

According to method 200, in step 202 RAID controller 120 begins by directing PCIe I/F 124 to contact PCIe I/F 134, based on the BAR address (provided by BIOS 116) for PCIe I/F 134. For example, command unit 122 can direct PCIe I/F 124 to generate a signal for accessing a specific portion of PIM 138. Once PCIe I/F 134 has been contacted, it can be accessed to retrieve the identifier (e.g., SAS address, a unique name, etc.) of RAID controller 130. Command unit 122 therefore utilizes PCIe I/F 124 to acquire the identifier of RAID controller 130 in step 204. The identifier can then be compared against discovery information, to determine whether the RAID controllers are operating in the same SAS domain. For example, if the identifier is a SAS address, it can be compared against a discovery list maintained at RAID controller 120 to determine whether RAID controller 130 is on the same domain.

Discovery information can be acquired at start of day (e.g., when the system is powered on) by RAID controllers 120 and 130 in order to detect other SAS devices that are on their SAS domain. This can occur before, during, or after steps 202-204, but prior to step 206. In step 206, command unit 122 determines whether or not the identifier (e.g., SAS address) of RAID controller 130 matches discovery information at RAID controller 120 (e.g., a SAS address in a discovery list maintained at RAID controller 120). For example, if the SAS address of RAID controller 130 is on the discovery list, then the RAID controllers are operating in the same SAS domain (because they can contact each other via the same SAS fabric). Thus, command unit 122 can activate cooperative storage device management features for RAID controller 120 in step 208 without the need for explicit intervention by host 110. These features enable cooperative management of storage devices between RAID controller 120 and RAID controller 130, thereby enhancing collaboration and/or redundancy between the storage controllers. For example, the features can include Redundant Array of Independent Disks volume migration on failover, I/O shipping between the controllers, shared I/O caching between the controllers, and coordinated communications between the controllers and host driver 114.

Alternatively, if the identifier (e.g., SAS address) of RAID controller 130 does not match discovery information for RAID controller 120 (e.g., is not within the discovery list for RAID controller 120), then the RAID controllers are determined to be operating on different SAS domains. If the RAID controllers are operating on different SAS domains, they do not implement cooperative features for each other (because they cannot access the storage devices/volumes managed by each other). Therefore, the feature(s) are not activated/enabled in step 210.

Once the RAID controllers are implementing cooperative management features, they can cooperatively control/manage/own any number of storage devices. Since host driver 114 and/or OS 112 are not needed to detect the cooperative management environment, the RAID initialization process does not have to wait for boot processes at OS 112 and can even be completed before OS 112 finishes booting. This means that RAID coordination between controllers can occur substantially in parallel with boot processes, increasing the speed at which host 110 completes booting and is able to access data maintained on storage devices 161-166. Method 200 therefore provides an advantage over prior architectures where a host would pause/delay its own boot processes in order to detect and coordinate the enablement of features (e.g., SSHA coordination features) between storage controllers.

Even though the steps of method 200 are described with reference to SSHA architecture 100 of FIG. 1, method 200 can be performed in other systems where RAID controllers operate together to service one or more storage devices. For example, method 200 can be performed in multi-server, multi-controller environments, by each RAID controller on a PCIe bus in order to identify each of peer controllers on the PCIe bus and determine whether those peers are located on the same SAS domain.

The steps of the flowcharts described herein are not all inclusive and can include other steps not shown. The steps described herein can also be performed in an alternative order.

Examples

In the following examples, additional processes, systems, and methods are described in the context of cooperative RAID management.

Figure 3:
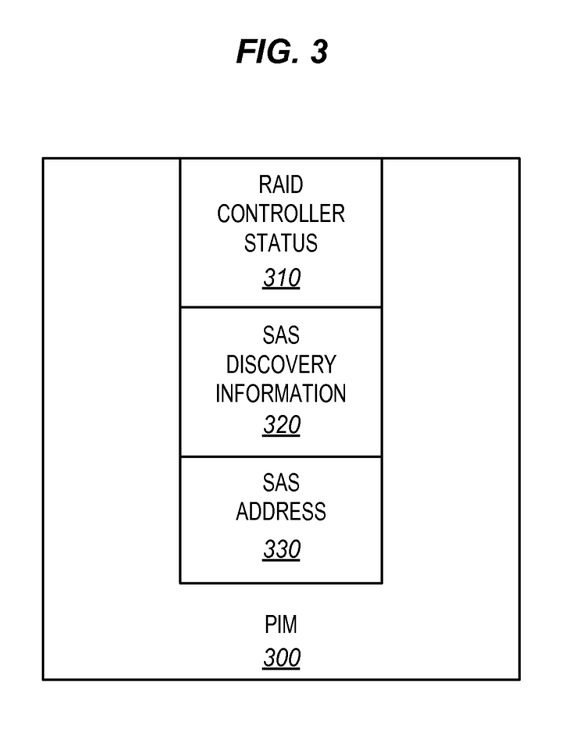
FIG. 3 is a block diagram illustrating the contents of an exemplary PIM of a PCIe interface of a RAID controller.

FIG. 3 is a block diagram illustrating the contents of an exemplary PIM 300 of a PCIe interface of a RAID controller. According to FIG. 3, PIM 300 includes not only SAS address 330, but also a RAID controller status 310, and SAS discovery information 320. RAID controller status 310 can be used by a RAID controller to indicate whether it is currently operating properly, is currently engaged in the discovery process, has encountered a failure, etc. In this manner, the RAID controllers can track the status of their peers via a PCIe bus, and without relying on SAS communications. This can help to mitigate the amounts of traffic generated on the SAS domain.

In this example, a RAID controller has been designated a "primary" discovery device (e.g., by a BIOS or HBA driver of a host), causing it to actively engage in discovery while other RAID controller(s) halt/prevent discovery and wait (e.g., utilizing their processing resources to perform other tasks). The command unit of the waiting RAID controller periodically checks on the status of the "primary" RAID controller until it determines that discovery of coupled devices has completed. After discovery has completed, the waiting RAID controller acquires discovery information 320 from PIM 300 and copies the discovery information into memory in order to accelerate its own discovery process. The waiting RAID controller can send a small/minimal number of commands to the devices in order ensure that the discovery data is accurate.

For example, the waiting RAID controller can send a Test Unit Ready (TUR) SCSI command to each device found by the primary discovery device, confirming that these devices are actually available. Designating a "primary discovery" RAID controller helps to reduce discovery traffic along the SAS domain, increasing the overall speed of the discovery process. In further embodiments, the waiting RAID controller engages in a private discovery process to identify any devices that are privately coupled with it (and therefore invisible to the primary discovery device). In some cases, discovered devices such as SATA disk drives can accept commands only from one initiator. The proposed method of discovery ensures that only one controller is accessing such devices during discovery, since the direct access to the drive is synchronized.

Figure 4:
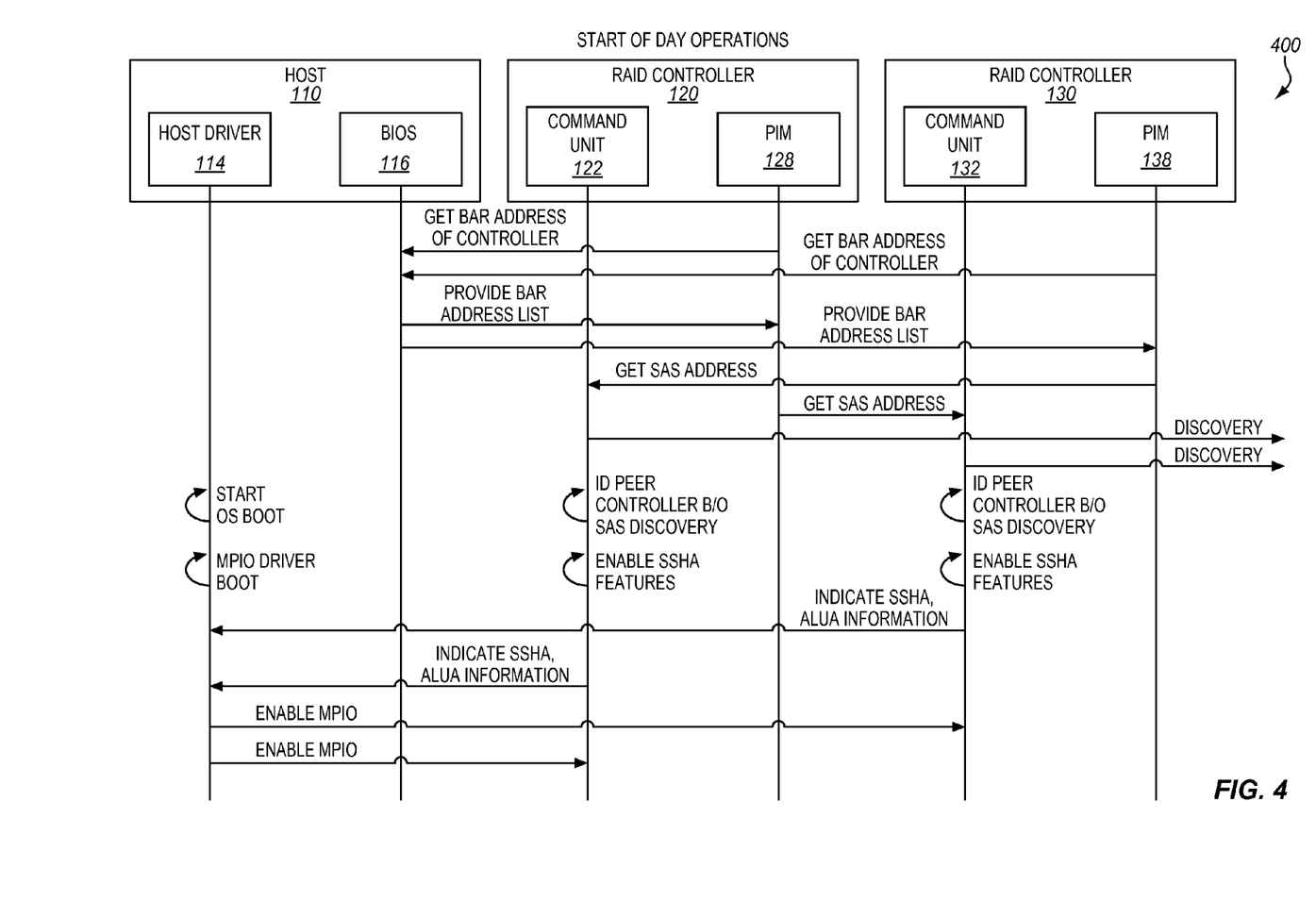
FIGS. 4-6 are message diagrams illustrating exemplary communications between devices in an SSHA architecture.
Figure 5:
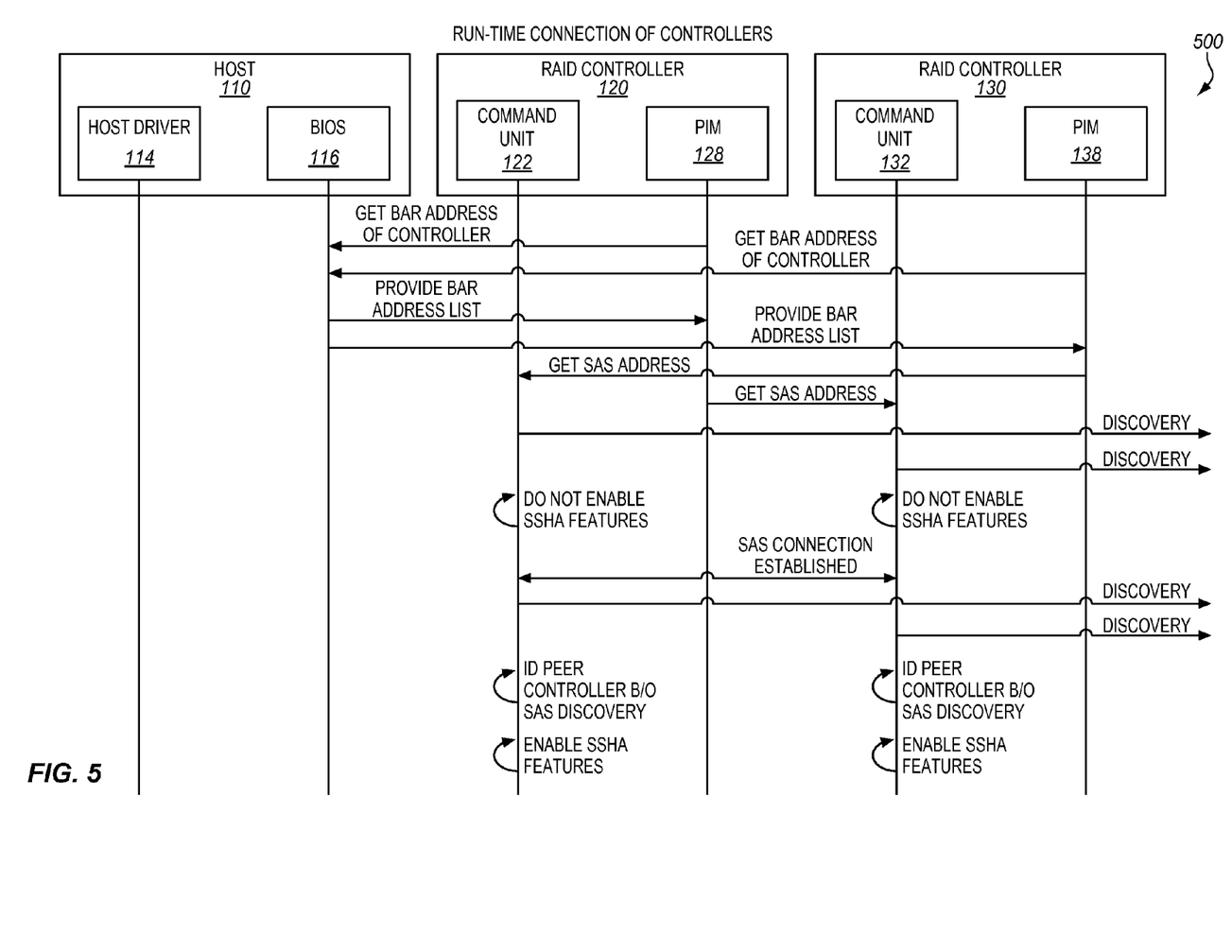
Figure 6:
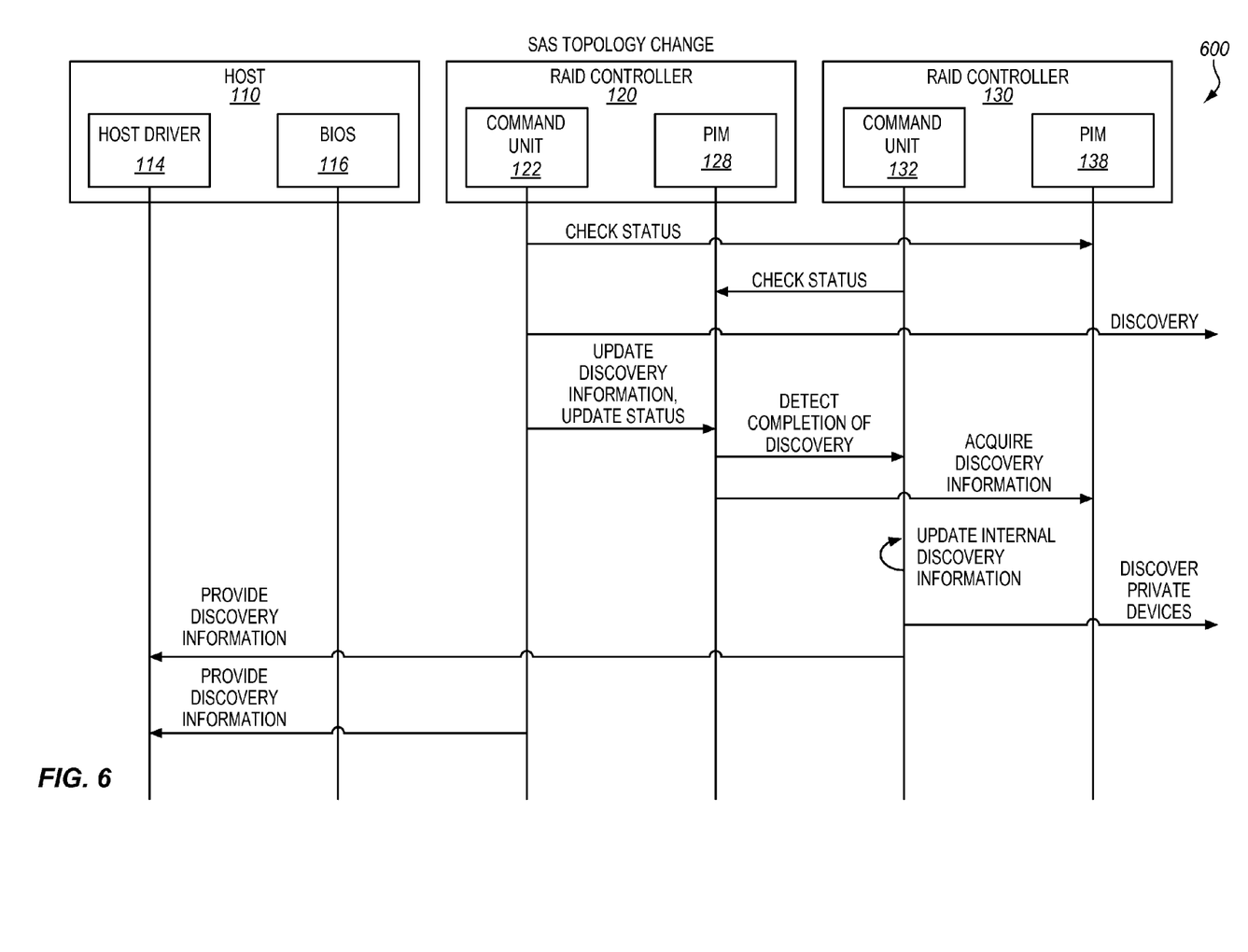

FIGS. 4-6 are message diagrams illustrating exemplary communications between devices in an SSHA architecture. Specifically, FIG. 4 is a message diagram 400 illustrating exemplary start of day operations within SSHA architecture 100. According to FIG. 4, at boot time BIOS 116 reviews the PCIe interface of each RAID controller in order to acquire the controller's BAR address. Then, BIOS 116 sends out a list to each controller indicating the BAR addresses of the controllers that share the same PCIe bus. A BIOS for the RAID controller, the system BIOS of the host, or a host driver can be used to provide this information.

The RAID controllers then utilize the received BAR addresses to access each other's PIM and determine each other's SAS address. Next, the RAID controllers engage in SAS discovery and identify other SAS devices on the SAS domain. Once they have completed their discovery processes, they each determine whether the SAS address of the other controller (retrieved from the PIM of the other controller) is on a locally kept discovery list. Once the RAID controllers have determined that they are on each other's discovery lists, (and are therefore on the same SAS domain), they begin to calibrate their processes to operate as part of an SSHA environment (e.g., to operate in an active-passive mode with respect to various logical volumes). The RAID controllers then indicate their SSHA enabled features to host driver 114, in order for host driver 114 to confirm usage of these cooperative management features, and/or to direct incoming host I/O requests properly. In this example, the information sent to host driver 114 includes ALUA information for each logical volume. Host driver 114 then sends out a confirmation to each RAID controller in order to confirm/allow usage of the enabled SSHA features. Finally, OS 112 completes its boot process and host driver 114 utilizes multipath techniques to access data via the RAID controllers in accordance with host I/O requests.

FIG. 5 is a message diagram 500 illustrating exemplary run-time configuration operations within SSHA architecture 100. According to FIG. 5, RAID controller 120 and RAID controller 130 are not initially connected to the same SAS domain. Because of this, the RAID controllers, even after receiving each others' BAR addresses, do not enable their SSHA features because they do not detect each other during discovery. However, at some point after the RAID controllers initialize, they are connected to the same SAS domain (e.g., because a physical SAS connection has been added to interconnect the switched fabrics of the RAID controllers).

When the connection is established, discovery is triggered by command units of the RAID controllers in order to detect each other as newly coupled devices. After this discovery process, the command units of the RAID controllers each check to determine if the other RAID controller's SAS address is on their discovery list. If so, the RAID controllers each enable one or more SSHA features, indicate the features to host driver 114, and wait for confirmation from host driver 114 to start operating in SSHA mode.

The message diagram of FIG. 5 can be implemented when both of the controllers are connected on the same PCIe bus, but are not connected to each other through SAS cabling directly or via an expander at start of the day. In this case, each of the controllers knows the SAS address(es) of the other controller(s) that are on the PCIe bus, but since they are not connected by a SAS link, the other controllers are not part of the same SSHA configuration. This is to say that the other controllers cannot implement redundancy for each other even though they are on the same PCIe bus. After the system is booted, if the controllers are connected via SAS cabling, SAS discovery starts, and if a SAS address obtained though SAS discovery matches an address obtained from the PIM of another controller, features are enabled at this time.

FIG. 6 is a message diagram 600 illustrating exemplary operations performed by RAID controllers after a SAS topology change has been detected (e.g., after a BROADCAST (CHANGE) primitive has been received at RAID controllers 120 and 130). According to FIG. 6, once each controller detects a topology change, it checks on the status of the other RAID controller indicated in the PIM of the other controller. If the status of the other RAID controller is still functional, then RAID controller 120, which in this example is the primary discovery device, engages in SAS discovery via port 129 to detect coupled physical devices, such as hard disks, while RAID controller 130 waits in order to reduce traffic on the SAS domain.

Once discovery completes at RAID controller 120, it updates discovery information stored at PIM 128 and updates its status at PIM 128 to indicate that discovery has completed. Command unit 132, which has been operating PCIe interface 134 to poll PIM 128, detects completion of discovery and proceeds to load the discovery information from PIM 128 into memory. Specifically, drive parameter information, herein referred to as physical drive discovery information, is directly copied from PIM 128 into memory of the command unit 132. Command unit 132 then uses this discovery information to interact with storage devices on the SAS domain, and engages in a private discovery process for any private devices coupled with RAID controller 130. RAID controller 130 also sends out a minimal number of commands to confirm that the discovered devices are available (e.g., by sending a TUR SCSI command to each device discovered by RAID controller 120). Both RAID controllers then provide their discovery information to host driver 114.

Discovery information describes the physical devices that both the RAID controllers are capable of communicating with via SAS, and does not necessarily include logical volume information. There are various stages in the discovery of a drive, indicated by inquiry commands for page 0, inquiry commands for page 83, inquiry commands for page 86, TUR commands, read capacity commands, mode sense and mode select commands, etc.

In a further example, enabling a feature comprises activating an ALUA configuration for the RAID controllers. ALUA configurations are beneficial when the same volume is visible to an MPIO driver via multiple RAID controllers. In this setup, host 110 sees a logical volume as two volumes with the same identifier available via each of RAID controllers 120 and 130. Based on this information, host 110 can determine that the same volume is available via two paths. An ALUA configuration helps host driver 114 to know which paths are active or inactive at a given point in time. The SCSI specification indicates that an ALUA configuration can be implemented, for example, via the following commands and attributes listed below.

INQUIRY VPD Page 0x00: this page includes standardized INQUIRY data. For this page, the TGPS field and a value of 01b are used to indicate support for implicit ALUA. INQUIRY VPD Page 0x83: this page is used to return a unique identifier for a logical volume. Via this field, host drivers can identify each reported instance of a logical volume, and properly associate logical volumes found of multiple paths. Relative Target Port Designator: this field is part of VPD page 0x83, and can be included in the page length returned. The designator type is 0x04, which indicates relative target port identifier (RTPI). The two ports used are 0x01 and 0x02 (only two nodes), which are ports A and B respectively. The field is filled in based on affiliation. Logical volumes that are affiliated to a local controller are given an RTPI of 0x01, while non-affiliated are given an RTPI of 0x02. Target Port Group: the target port group (TPG) is part of VPD page 0x83, and is included in the page length returned. The designator type is 0x05. Logical volumes that are affiliated to the local controller are given a TPG of 0x01, while non-affiliated logical volumes are given a TPG of 0x02. REPORT TARGET PORT GROUPS: the REPORT TARGET PORT GROUPS (RTPG) command will report the supported ALUA states. It will also report the target port number used. The RTPG command will return two target port descriptors, with the first indicating an AO status (an active/optimized primary target port asymmetric access state), and the second indicating an ANO status.

Figure 7:
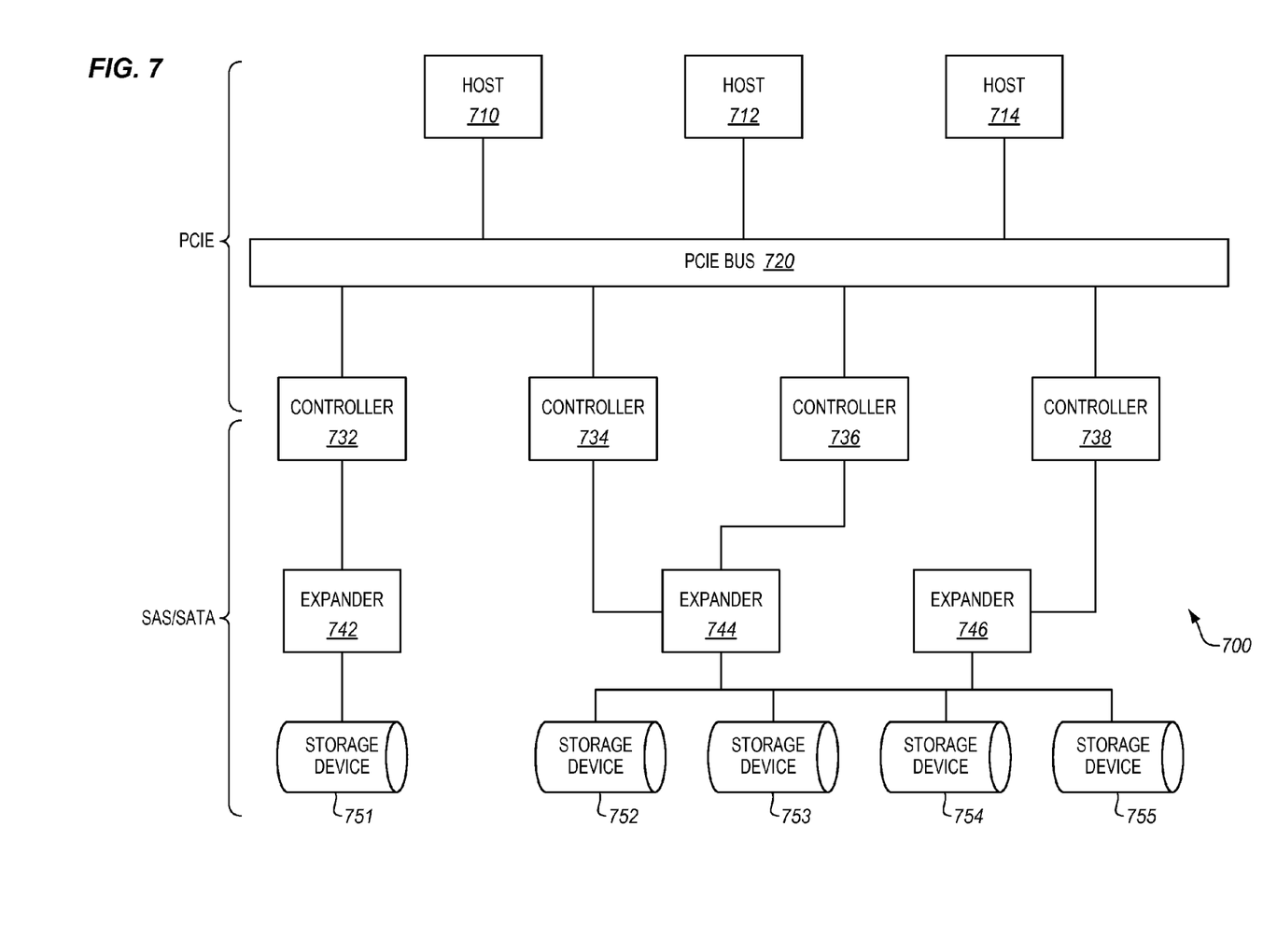
FIG. 7 is a block diagram of a multi-server RAID environment.

FIG. 7 illustrates an exemplary multi-server, multi-controller architecture 700. In this architecture, multiple hosts 710-714 are coupled to PCIe bus 720, and multiple controllers 732-738 are also coupled to PCIe bus 720. Each host 710-714 can access any controller 732-738 via PCIe bus 720. In this embodiment, each controller accesses the PIM of each other controller in order to determine the SAS addresses of these potential peer controllers. Each controller further engages in discovery, and compares the SAS addresses acquired during discovery (and maintained in a discovery list) against the SAS addresses acquired from the PIMs of the other controllers. If there is a match between a SAS address acquired via a PIM of another controller, and a SAS address indicated on the discovery list, then the other controller is a peer controller, and cooperative RAID management features are enabled and reported to each host. Alternatively, if the controller has no peer controllers on the same SAS domain, then it does not enable these enhanced features. In this example, controller 732 does not enable cooperative RAID management features because it has no peers on the SAS domain that includes expander 742 and storage device 751. Meanwhile, controllers 734-738 enable their cooperative management features, because they are on the same SAS domain comprising expanders 744-746 and storage devices 752-755.

Figure 8:
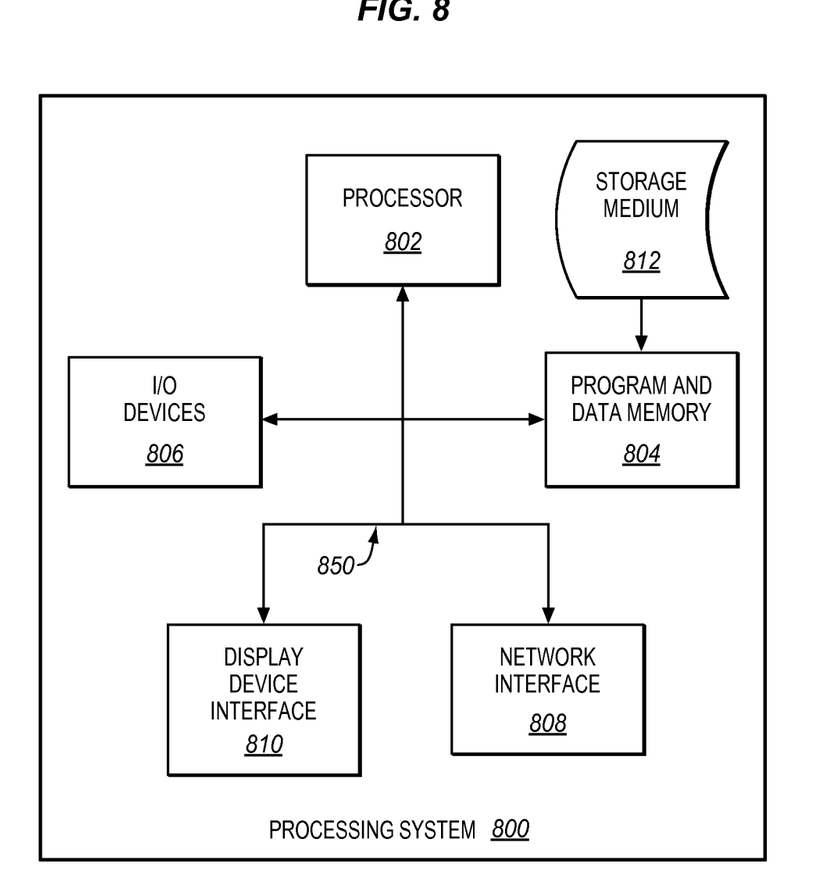
FIG. 8 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of command unit 122 to perform the various operations disclosed herein. FIG. 8 illustrates an exemplary processing system 800 operable to execute a computer readable medium embodying programmed instructions. Processing system 800 is operable to perform the above operations by executing programmed instructions tangibly embodied on computer readable storage medium 812. In this regard, embodiments of the invention can take the form of a computer program accessible via computer readable medium 812 providing program code for use by a computer (e.g., processing system 800) or any other instruction execution system.

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 can also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 810 can be integrated with the system to interface to one or more display devices, such as printing systems and screens for presentation of data generated by processor 802.

What is claimed is:

1. A system comprising:
   a Redundant Array of Independent Disks controller comprising:
      a Peripheral Component Interconnect Express interface;
      a Serial Attached Small Computer System Interface port operable to communicate with another Redundant Array of Independent Disks controller; and
      a command unit operable to direct the interface to contact another Peripheral Component Interconnect Express interface at the other controller, to acquire an identifier of the other controller stored in a Peripheral Component Interconnect Express Inbound Map for the other interface, and to activate a feature for the controller that enables cooperative management of storage devices between the controller and the other controller, if the identifier of the other controller matches discovery information maintained at the controller.

2. The system of claim 1, wherein:
   the command unit is further operable to contact the other interface by using a Base Address Register address that indicates a location of the other interface on a Peripheral Component Interconnect Express bus shared by both controllers.

3. The system of claim 1, wherein:
   the identifier comprises a Serial Attached Small Computer System Interface address of the other controller, and the command unit is further operable to activate the feature if the address of the other controller matches an address in a discovery list maintained at the controller.

4. The system of claim 1, wherein:
   the interface comprises a Peripheral Component Interconnect Express Inbound Map that includes Serial Attached Small Computer System Interface discovery information acquired by the controller.

5. The system of claim 1, wherein:
   the command unit is further operable to detect a change in Serial Attached Small Computer System Interface topology, to detect Serial Attached Small Computer System Interface discovery information stored in the Peripheral Component Interconnect Express Inbound Map of the other interface, and to utilize the discovery information to accelerate discovery at the controller.

6. The system of claim 1, wherein:
   the feature is selected from the group consisting of:
   Redundant Array of Independent Disks volume migration on failover, Input/Output shipping between the controllers, shared Input/Output caching between the controllers, and coordinated communications between the controllers and a Multipath Input/Output driver of a host device shared by the controllers.

7. The system of claim 1, wherein:
   the command unit is further operable to enable the feature before an operating system of a host device has finished booting.

8. A method comprising:
   directing a Peripheral Component Interconnect Express interface of a Redundant Array of Independent Disks controller to contact another Peripheral Component Interconnect Express interface of another Redundant Array of Independent Disks controller;
   acquiring an identifier of the other controller stored in a Peripheral Component Interconnect Express Inbound Map for the other interface; and
   activating a feature for the controller that enables cooperative management of storage devices between the controller and the other controller, if the identifier of the other controller matches discovery information maintained at the controller.

9. The method of claim 8, further comprising:
   contacting the other interface by using a Base Address Register address that indicates a location of the other interface on a Peripheral Component Interconnect Express bus shared by both controllers.

10. The method of claim 8, wherein:
    the identifier comprises a Serial Attached Small Computer System Interface address of the other controller; and the method further comprises:
    activating the feature if the address of the other controller matches an address in a discovery list maintained at the controller.

11. The method of claim 8, wherein:
    the interface comprises a Peripheral Component Interconnect Express Inbound Map that includes Serial Attached Small Computer System Interface discovery information acquired by the controller.

12. The method of claim 8, further comprising:
    detecting a change in Serial Attached Small Computer System Interface topology;
    detecting Serial Attached Small Computer System Interface discovery information stored in the Peripheral Component Interconnect Express Inbound Map of the other interface; and utilizing the discovery information to accelerate discovery at the controller.

13. The method of claim 8, wherein:
the feature is selected from the group consisting of:
Redundant Array of Independent Disks volume migration on failover, Input/Output shipping between the controllers, shared Input/Output caching between the controllers, and coordinated communications between the controllers and a Multipath Input/Output driver of a host device shared by the controllers.

14. The method of claim 8, further comprising:
enabling the feature before an operating system of a host device has finished booting.

15. A system comprising:
a Redundant Array of Independent Disks controller comprising:
  means for communicating via a Peripheral Component Interconnect Express bus;
  means for communicating with another Redundant Array of Independent Disks controller; and
  means for contacting a Peripheral Component Interconnect Express interface at the other controller, acquiring an identifier of the other controller stored in a Peripheral Component Interconnect Express Inbound Map for the interface, and activating a feature for the controller that enables cooperative management of storage devices between the controller and the other controller, if the identifier of the other controller matches discovery information maintained at the controller.

16. The system of claim 15, wherein:
the means for contacting is further for contacting the interface by using a Base Address Register address that indicates a location of the other interface on a Peripheral Component Interconnect Express bus shared by both controllers.

17. The system of claim 15, wherein:
the identifier comprises a Serial Attached Small Computer System Interface address of the other controller, and the means for contacting is further for activating the feature if the address of the other controller matches an address in a discovery list maintained at the controller.

18. The system of claim 15, wherein:
the means for communicating via a Peripheral Component Interconnect Express bus comprises a Peripheral Component Interconnect Express Inbound Map that includes Serial Attached Small Computer System Interface discovery information acquired by the controller.

19. The system of claim 15, wherein:
the means for contacting is further for detecting a change in Serial Attached Small Computer System Interface topology, detecting Serial Attached Small Computer System Interface discovery information stored in the Peripheral Component Interconnect Express Inbound Map of the interface, and to utilize the discovery information to accelerate discovery at the controller.

20. The system of claim 15, wherein:
the feature is selected from the group consisting of:
Redundant Array of Independent Disks volume migration on failover, Input/Output shipping between the controllers, shared Input/Output caching between the controllers, and coordinated communications between the controllers and a Multipath Input/Output driver of a host device shared by the controllers.

\* \* \* \* \*